No. 793,618. PATENTED JUNE 27, 1905.
W. J. SMITH.
ANTISKIDDING ATTACHMENT FOR PNEUMATIC TIRES.
APPLICATION FILED FEB. 28, 1905.
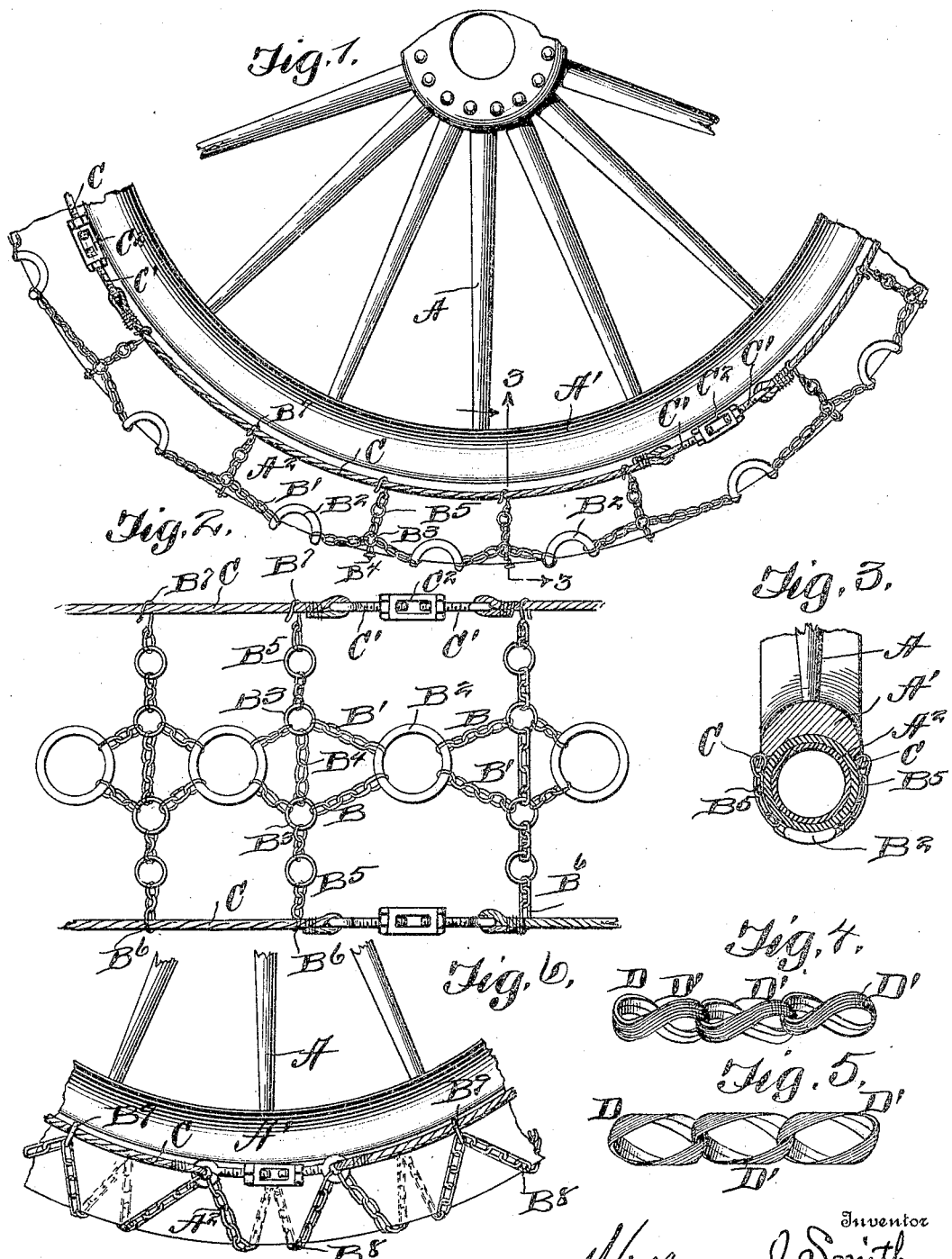

No. 793,618.

Patented June 27, 1905.

UNITED STATES PATENT OFFICE.

WILLIAM J. SMITH, OF CANASTOTA, NEW YORK.

ANTISKIDDING ATTACHMENT FOR PNEUMATIC TIRES.

SPECIFICATION forming part of Letters Patent No. 793,618, dated June 27, 1905.

Application filed February 28, 1905. Serial No. 247,716.

*To all whom it may concern:*

Be it known that I, WILLIAM J. SMITH, a citizen of the United States, residing at Canastota, in the county of Madison and State of New York, have invented certain new and useful Improvements in Antiskidding Attachments for Pneumatic Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an antislipping armor for tires, and particularly to a structure adapted for application to an inflated tire.

The invention has for an object to provide an improved construction of attaching means by which the chain mat or armor may be applied to the tire and retained in position by an adjustable cable disposed at opposite sides of the tire and provided with turnbuckles at different points in its length.

Another object of the invention is to provide an improved construction and arrangement of this chain armor by which the chains extend diagonally to the circumference of the wheel as distinguished from a chain extending directly across the wheel at a right angle to its circumference. This arrangement, which has been heretofore used, is found objectionable, as the pull and resistance upon the chain causes it to roll or turn upon the surface of the tire and prevents its being held rigidly in position.

Other and further objects and advantages of the invention will be hereinafter set forth and the novel features thereof defined in the appended claims.

In the drawings, Figure 1 is a side elevation of a portion of a wheel with the invention applied thereto. Fig. 2 is a plan view of a section of the chain armor removed. Fig. 3 is a cross-section on line 3 3 of Fig. 1. Fig. 4 is an edge view of the twisted link. Fig. 5 is a plan view of this link, and Fig. 6 is a side elevation of a modified application of the invention.

Like letters of reference refer to like parts in the several figures of the drawings.

The letter A designates the wheel, which may be of any desired construction and is provided upon its rim or felly with a suitable pneumatic, elastic, or other tire $A^2$. The preferred form of chain armor or mat, as shown in Figs. 1, 2, and 3, comprises the chain-sections B and B', extending at an angle to each other and each disposed diagonally to a central line extending circumferentially of the tire, so that the draft upon these chains is received in part along their length. The chains may be connected together at their intersection by means of a suitable ring or eye $B^2$. These chain-sections are arranged in series and connected together by rings $B^3$ at each end, which rings are connected laterally by a chain-section $B^4$ and also provided with a link and chain section $B^5$ for attachment to the holding cables or strands C. For the purpose of making this attachment one of the chains $B^5$ may be provided with an eye $B^6$, through which the cable is threaded, and the opposite chain $B^5$, formed with a hook $B^7$ thereon to engage the cable at that side of the tire. These parts are duplicated in series, and the length of chain in each section may be varied as found most desirable or convenient in use. In Fig. 6 a modified application of this chain is presented, wherein a continuous length of chain $B^8$ is used and extends diagonally back and forth across the surface of the tire, thus presenting a series of diagonal chains extending in opposite directions, but not intersecting, as in Fig. 2. This chain $B^8$, as shown in Fig. 6, is provided with eyes or hooks $B^9$ for attachment to the holding-cable C in any desired manner.

The links of the chain used in the armor may be of any desired construction or arrangement, but are preferably flattened, as shown at D in Figs. 4 and 5, and then twisted laterally, so as to present a gripping edge D' upon the surface of the ice or other slippery material with which this armor coöperates.

The holding-cables C are preferably formed in sections, as shown in Fig. 1, in order that the adjustment for retaining the armor in position may be equal at different points throughout the wheel, and for the purpose of effecting this adjustment the opposite ends of each cable are provided with any desired form of turnbuckle. For instance, a threaded bolt, as shown at $C'$, is secured to the opposite ends of adjacent cables and connected by the buckle $C^2$, as shown in Figs. 1 and 2. These cables being disposed at the opposite sides of the tire, as shown in Fig. 3, when drawn tightly will grip and retain the armor in position and adapt the armor for application to a tire when fully inflated. The arrangement of the chain armor carried by these cables permits one of the cables to be always retained upon the armor, while the armor may be attached to the other cable without delay by means of the hooks $B^7$, especially adapted for that purpose.

It will be seen in the use of the invention that the rolling and pulling of the chain armor, which extends at a right angle to the periphery of the tire, is entirely prevented by the diagonal disposition of the armor in the present instance, and this armor is rigidly and firmly secured to the tire in the manner described.

It will be obvious that changes may be made in the details of construction and configuration without departing from the details of the invention as defined by the appended claims.

Having thus fully described my invention, what I claim as new, and desire to secure by Letters Patent, is—

1. An armor for tires comprising a chain mat extending circumferentially of the tire about the tread-surface thereof, cable-sections, turnbuckles, threaded eyebolts mounted in the opposite ends of said turnbuckles, said cable-sections connected to the eyes of said bolts, and hooks connecting said chain mat with the cable-sections, as set forth.

2. An armor for tires comprising a chain mat composed of flattened links twisted laterally to present a side edge thereof upon the periphery of the tire, as set forth.

In testimony whereof I hereunto affix my signature in presence of two witnesses.

WILLIAM J. SMITH.

Witnesses:
CHARLES W. WORDEN,
R. R. BEMISS.